Patented Nov. 3, 1942

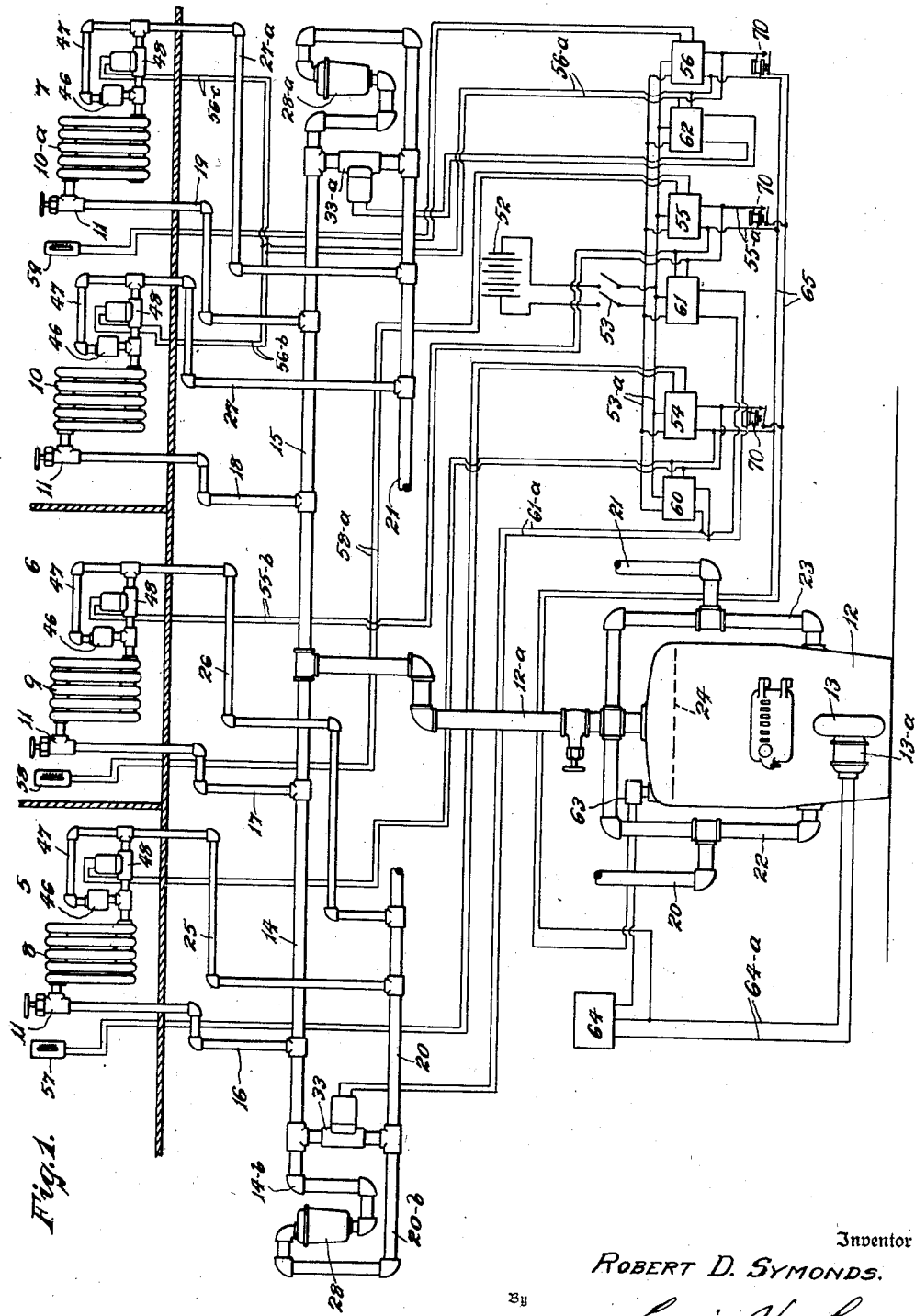

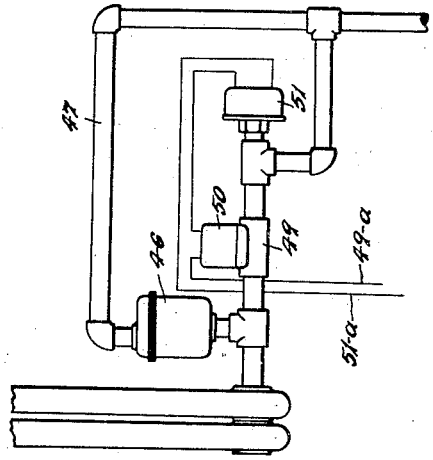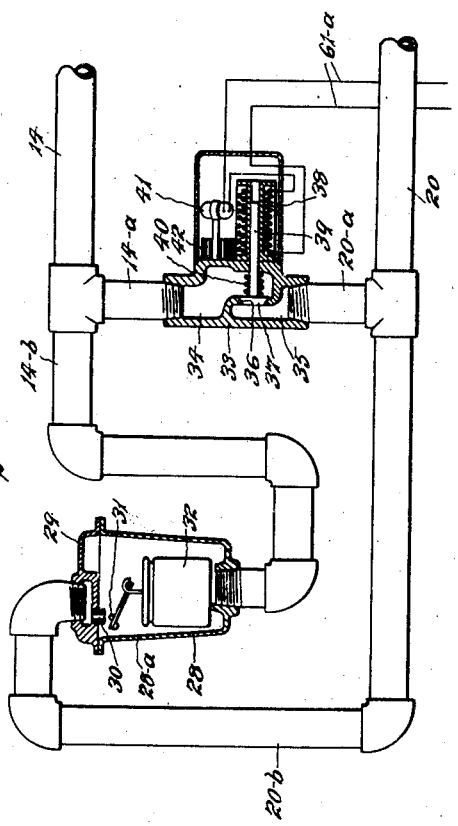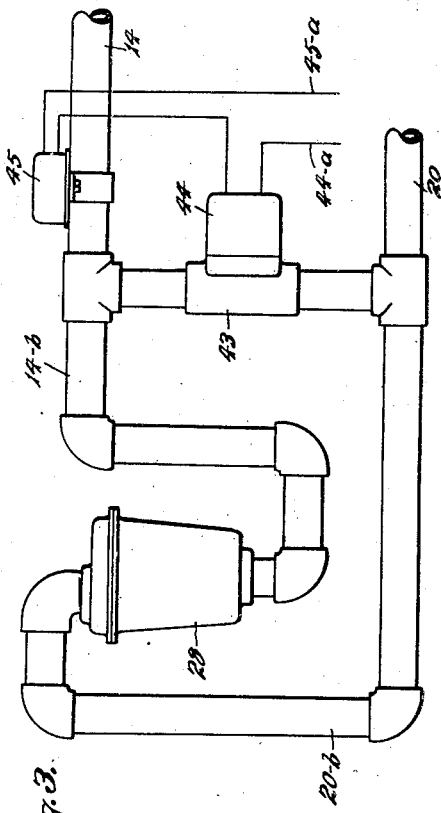

2,301,153

UNITED STATES PATENT OFFICE 2,301,153

ZONE HEATING SYSTEM

Robert D. Symonds, Wethersfield, Conn.

Application October 23, 1939, Serial No. 300,774

8 Claims. (Cl. 237—9)

This invention relates to zone heating systems and particularly to an improved system for maintaining pre-determined temperature conditions in each of a plurality of zones which are supplied with heat from a single heating plant. The present invention may be used with advantage in connection with any heating system and particularly with systems of the vacuum type; in which the heat transfer medium is circulated through the system and drawn back into the heating plant by the vacuum which is formed through the cooling thereof.

In heating systems, such as those for apartment houses, office buildings and the like, it is desirable, from the standpoint of economy, to supply heat to a plurality of rooms, apartments of like separate zones from a single heating plant.

It is also desirable, for the convenience of occupants of each of the different zones, that such systems be provided, for each zone, with a thermally responsive controlled means such as a commonly known thermostat which is subject to individual adjustment and capable of controlling the system to independently maintain pre-determined temperatures in the respective zones.

It is required that the heating system be capable of supplying the proper amount of heat to each zone at any time that the temperature falls below the desired limit regardless of the temperature conditions in any of the other zones and that no heat be supplied to any zone which is at, or above, its minimum desired temperature limit even when the thermally responsive means in others of the zones are calling for heat.

When the zone calls for heat, it is very important that the said call be answered in the shortest possible time so that the temperature within the zone may be kept substantially constant; this being attained by the use of a novel valve, in connection with my improved zone heating system, which will permit rapid operation of the system and circulation of the heat transfer medium.

The object of this invention, therefore, is to provide a heating system, preferably of the vacuum type, which is highly efficient in maintaining a substantially constant temperature is different rooms or zones heated thereby, which is simple in construction and positive in its operation.

A further object is to provide a heating system having a novel arrangement of communicating means, for the heat transfer medium, in which is included a novel valve that is automatically controlled, in connection with a thermally responsive means in a zone, to separately permit prompt circulation of the heat transfer medium in that section of the system which is connected with the particular room or zone calling for heat, so as to prevent the temperature in said zone from dropping considerably before the said heat transfer medium reaches the same.

Further objects of this invention will be clearly understood from the following description and from the accompanying drawings in which:

Figure 1 is a diagrammatic view illustrating a system embodying my invention.

Figure 2 is an enlarged fragmentary view of a portion of said system, partly in central vertical section.

Figure 3 is a view of the said portion of the system in modified form.

Figure 4 is a fragmentary view illustrating a further modification in a portion of the system adjacent to a space heater.

As illustrated in the drawings, the numerals 5, 6 and 7 denote separate zones or rooms which are heated by means of radiators 8, 9, 10 and 10—a respectively, each of which are provided with a manually operatable valve 11 for manually controlling the supply of the heat transfer medium to the radiators.

Each of said radiators are supplied with a heat transfer medium that is heated in a central heating plant 12, of a conventional form, preferably by means of a hydro-carbon burner 13 that is electrically driven.

The said heating plant is connected to all of said rooms or zones by means of a main supply pipe 12—a that branches off into secondary supply pipes 14 and 15 which are connected to the radiators of certain zones. The secondary pipe 14 is connected to the radiators 8 and 9 in the zones 5 and 6 by means of the connecting pipes 16 and 17 and the secondary pipe 15 is connected to each of the radiators 10 and 10—a in the zone 7 by means of the connecting pipes 18 and 19.

The said secondary pipe 14 is provided with a return pipe 20 and the secondary pipe 15 with a return pipe 21; both of which return pipes lead back to the heating plant through a standard return system consisting of a conventional horizontal return trap and air vent or vacuum pump, not shown, and are connected to said heating plant by means of the equalizing pipes 22 and 23 that form what is commonly known as a Hartford loop; the said loop being connected to the bottom of the heat transfer medium chamber in the heater 12 and to the main supply pipe 14 so as to equalize the pressure in the heating plant and thereby retain the heat transfer medium substantially at a level such as indicated by the dotted lines 24.

Each of the radiators 8 and 9 are respectively connected to the return pipe 20 by means of the return connecting pipes 25 and 26 and each of the radiators 10 and 10—a are respectively connected to the return pipe 21 by the return connecting pipes 27 and 27—a.

It is well known that in such heating systems, the circulation of the heat transfer medium, through the radiators in the different zones, is controlled by means of a suitable device 28 which permits a slow movement of said heat transfer medium through the pipes of the system. One of such devices is clearly illustrated in Figure 2 of the drawings and is commonly known as a bucket trap and it is connected between each of the secondary supply pipes 14 and 15 and the return pipes 20 and 21 and consists of a container 28—a that is mounted to the end of the pipe 14. A cover 29 is mounted on the said container and has a small vent opening 30 which is opened or shut by means of a valve 31 that is operated by an inverted type bucket 32 which is provided with a small orifice in the inverted bottom thereof to slightly release any accumulation of air therein and permit the bucket to sink in the condensate within the trap and open the valve 31. as will be commonly understood by those skilled in the art; the said bucket thereof operates to close the valve opening 30 when a certain amount of air enters in the bottom thereof, and opens said valve when the passage of air into the container 28—a has stopped; thus permitting a normal, slow circulation of the heat transfer medium from the secondary supply pipe 14 to the return pipe 20 and consequently through the entire system, which includes the radiators in the different zones.

Such vents as that indicated at 30, in Figure 2, have necessarily been of a small size in order to permit steady circulation of the heat transfer medium and to retain the said heat transfer medium within the radiators for a length of time which is commensurate with its rate of cooling. Therefore, such vents have necessarily retarded the circulation of the heat transfer medium, during the normal operation of the heating system, with the result that the delivery of said heat transfer medium to a zone calling for heat has been delayed to the point where a substantial rise and fall of temperature, from the desired degree, has had to be accepted.

In order to accelerate the transfer of the heat transfer medium to a zone which is calling for heat, so that the temperature in the said zone may be kept at a substantially constant degree, I provide, as an element of this invention, a combination thermally and electrically controlled valve in addition to the above described bucket type trap.

The said combination valve consists of a housing 33 which, as clearly illustrated in Figure 2, is connected to the secondary supply pipe 14 by means of a nipple 14—a, to the return pipe 20 by means of a nipple 20—a.

The said housing is provided with passages 34 and 35, which communicate through a valve opening 36 within which is seated a valve head 37 that is operated by means of a solenoid 38.

The said solenoid acts upon a stem 39 to withdraw said head from the valve opening against the tension of a return spring 40.

The said valve is also provided with an electric switch that may be of the mercury type, such as indicated at 41, and, operated by means of a thermostatic member; preferably in the form of a bi-metal coil 42 which is responsive to the temperature of the heat transfer medium to actuate the said switch.

As illustrated in Figure 3, my invention may be embodied in the use of a conventional form of a valve, such as indicated at 43, that is operated by a solenoid in the casing 44, and a thermally responsive switch, also of a conventional form, such as indicated at 45; the said switch being connected directly to a suitable portion of the system, such as return pipe 14, wherein it will be responsive to the temperature of the heat transfer medium to control the solenoid of the valve 43.

Each of the radiators, or space heaters, in the different zones are provided with a return trap 46 that is connected to the return pipe, such as the pipe 22, through a by-pass 47. The said return trap may be of any conventional type which will control the circulation of the heat transfer medium through the radiator at a slow, fixed rate, by means of a small opening in said trap that permits the passage of the heat transfer medium through the by-pass 47 into the return pipe.

In addition to said conventional form of trap, a combination thermally and electrically operated valve 48, similar to the valve 33, is also provided to permit rapid circulation of the heat transfer medium, through the radiator, for rapidly heating the same when the zone heated thereby calls for heat.

As illustrated in Figure 4, my invention may also be embodied in the use of a conventional form of an electrically operated valve 49 which is actuated by means of a solenoid in the casing 50 and controlled through a thermally operated switch 51, also of a conventional form, that may be connected to the return pipe, as shown, or in such position that it will be responsive to the temperature of the heat transfer medium in said pipe.

In order to operate said system, I provide an electric circuit including a series of heat responsive means, relays and other conventional electrical apparatus, for controlling the operation of the heating system in accordance with the temperatures desired in the different zones.

The said electric circuit includes a source of energy 52 which is connected through a switch 53 to a series of primary relays 54, 55 and 56 that are controlled by manually adjustable heat responsive means, such as the thermostats 57, 58 and 59 which are located in the separate zones 5, 6 and 7.

Secondary relays 60, 61 and 62 are controlled by the said primary relays to operate different units of the system as will be hereinafter described.

The heating plant 12 is provided with a conventional form of pressuretrol 63 which controls the operation of the burner 13 through a protector relay 64.

My improved heating system will be more clearly understood from a description of the operation thereof which is as follows:

Assuming that the system has been put into operation by closing the switch 53, that it is desired to heat the zone 6 to a temperature of 72 degrees and that the thermostat 58 has been set for that temperature, the said thermostat will operate the primary relay 55, which is connected thereto by means of the wires 58—a, and close a switch in said relay. The closing of said switch will close the electric circuit leading from the main wires 53—a, through the wires 55—a, to the wires 65 which lead to the protector relay 64 through the pressuretrol 63, and operate the said protector relay to start the operation of the burner 13; the electric motor 13—a of which, is connected to said protector relay by means of the wires 64—a.

The closing of the switch in the primary relay 55 will also operate the secondary relay 61, which is connected to the combination release valve 32 through the wires 61—a, and energize the solenoid in said valve to open the same and permit free circulation of the heat transfer medium through the secondary pipe 14 to the return pipe 20. At the same time, the operation of the relay 55 by the thermostat 58 will also close the circuit through the wires 55—b, which extend from the wires 55—a to the release valve 48 in zone 6, and operate said valve, in the same manner as the valve 32 is operated, to permit free circulation of the heat transfer medium from the connecting pipe through the radiator 9 to the return pipe 26.

The relays 70, will prevent electric current from passing through the circuits when any one of said relays is closed. These relays may be of any well known form, such as used to act solely as a switch which is closed when energized by the closing of the secondary relays.

The said system will now operate to heat the heat transfer medium therein and rapid circulation of said medium through the radiator 9 in zone 6 is permitted because the valves 33 and 48 are open. When the temperature of the heat transfer medium in the pipe 14 has reached the pre-determined degree, the heat responsive coil 42 will operate the switch 41 to break the circuit leading to the solenoid 39; thereby permitting the spring 40 to close the said valve and stop the rapid circulation of the heat transfer medium through that portion of the system. From this time, normal circulation of the heat transfer medium will be permitted through the bucket type trap 28 which connects the supply pipe 14 to the return pipe 20, through a by-pass consisting of a pipe connection 14—b, leading to the trap, and a pipe connection 20—b leading from said trap to return pipe 20.

The rapid circulation of the heat transfer medium through the radiator 9 will heat the zone 6 until a temperature of 72 degrees has been attained therein. At this time the thermostat 58 will operate to break the circuit through the relay 55 and thereby close the valve 48 and, at the same time, stop the operation of the burner if the said burner has not already been stopped by the operation of the pressuretrol 63. The said operation of the relay 55 will also break the circuit leading to the valve 33 and thereby close said valve if it has not already been closed by the operation of the switch 41 in response to the temperature of the heat transfer medium.

It will be understood that when the valve 48 in the radiator of the zone 6 is closed, normal circulation of the heat transfer medium through the radiator will be permitted through the conventional return trap 46 and the by-pass 47 leading to the return pipe 26.

Although the zones 5 and 6 are both connected to the secondary supply pipe 14, rapid circulation of the heat transfer medium will be permitted only to the zone which is calling for heat, for the reason that the valve 48, in a zone which is not calling for heat, will be closed and circulation of the heat transfer medium through the radiator therein will be retarded, if not entirely prevented by reason of valve 11 having been closed to render said radiator inactive.

The operation of the system, when any of the other zones are calling for heat, is the same as above described. It will be noted that each of the thermostats in the zones are connected to a separate relay and that each of the said separate relays lead to the burner 13 and also to the valve 33 in that portion of the system which communicates the heat transfer medium to said zones. Thus, the thermostat 59 controls the temperature of the zone 7 which is heated by means of the two radiators 10 and 10—a. The said thermostat controls the relay 56 which, through the wires 56—a, 56—b and 56—c, is connected to the release valves 48 of the radiators 10 and 10—a and operates said valve simultaneously to control the circulation of the heat transfer medium therethrough. The relay 56 also operates the secondary relay 62 to control the operation of the release valve 33—a which is connected to that portion of the system that includes the supply pipe 15 which communicates with the radiators in zone 7, and the said relay 56 also is connected, through the wires 65, to operate the burner 13.

It will also be noted that in zones having a plurality of radiators, such as zone 7, each radiator will, to a certain extent, be operated independently of the other and according to its position in that zone. In other words, the release valve 48 will reduce the circulation of the heat transfer medium through a radiator to its normal rate when the said valve has reached a pre-determined temperature. Therefore, if a radiator in one certain section of the room has reached a pre-determined temperature before a radiator in another section of the room, circulation in the first radiator will be retarded while circulation in the other radiator will be maintained at the rapid rate; thus permitting uniform heating of all sections in a zone.

It will be clearly understood that, by reason of the series of valves 33 and 48 in the system, I have provided a heating system which will rapidly respond to a call for heat from a plurality of zones to separately maintain a substantially constant temperature in each of said zones.

While a normal amount of circulation of the heat transfer medium is permited through a zone which is not calling for heat, on account of the conventional trap 46, this circulation is not sufficient to rapidly raise the temperature of the zone and, actually, it will be found insufficient to heat the zone to a substantially high temperature. Therefore, the amount of heat which is delivered to a zone that is inoperative will simply serve to prevent the temperature in that zone from dropping to a dangerous degree. If, however, it should be desired to disconnect said zone or prevent any circulation of the heat transfer medium through the radiators therein, it may be done by simply closing the valve 11 of the radiator.

From the above description it will be clearly understood that I have provided a heating system whereby the temperature in a plurality of separate zones may be initially raised to a desired degree at a rapid rate and maintained at a substantially constant desired level in each of said zones independently of the other zones.

While I have shown the use of a combination electrically and thermally operated release valve 33 and 48, the form of said valves may be modified, by locating the heat responsive switch outside of the valve and in thermal conductive relation to the pipes of the system. As illustrated in Figure 3, the release valve indicated at 43 may include only a solenoid which is mounted within the casing 44 for operating the valve and a thermally responsive electric switch of a conventional form such as indicated at 45, may be mounted directly upon a portion of the system such as the pipe 14.

In such a combination, the electric energy will be supplied to operate the valve through the wires 44—a and 45—a, one of which leads from the electric circuit directly to the solenoid in the valve and the other which leads to said solenoid through the electric switch 45.

As illustrated in Figure 4, the combination valve 48 may be in the form of the valve 49 which includes only a solenoid that is mounted within the casing 50 for operating the valve. The heat responsive switch may be separately mounted in the system and may be of a conventional form of such switches as indicated at 51. The electric energy is supplied to the valve through wires 49—a and 51—a, one of which extends directly from the electric circuit to the solenoid in said valve and the other of which extends to said solenoid through the switch 51.

It will be understood that, in each of the modified installations illustrated in Figures 3 and 4, the electric switches are responsive to the temperature of the heat transfer medium in the pipe on which said switches are mounted and that they will open the circuit when the said heat transfer medium has reached a certain pre-determined temperature; thereby de-energizing the solenoid in the valves connected therewith and permitting said valves to close to reduce the rapid initial circulation of the heat transfer medium to the normal rate which is permitted by the traps 28 and 46.

I claim:

1. A heating system comprising means for heating a heat transfer medium, a heater, supply conductors for conducting said heat transfer medium from said heating means to said heater, a return conductor for conducting said heat transfer medium from said heater to said heating means, a valve in said return conductors, thermally operated means responsive to a drop in temperature in said conductors for controlling said valve to permit rapid circulation of said heat transfer medium until the same has reached a substantially predetermined temperature, a by-pass around said valve in said return conductor and a condensate trap in said by-pass having means for permitting normal circulation of said heat transfer medium.

2. A heating system comprising means for heating a transfer medium, a space heater, a supply conductor for conducting said medium from said heating means to said heater, a return conductor for conducting said medium from said heater to said heating means, a condensate trap between said supply and return conductors having an orifice for permitting normal circulation of said heating means, a by-pass around said trap, and a valve in said by-pass adapted to open in response to a drop in temperature in said system for permitting rapid circulation of said medium through said by-pass until said system has reached a substantially pre-determined temperature.

3. A zone heating system of the character described comprising a central heating plant, an electrically operated fuel burner for heating a heat transfer medium in said plant, a space heater in a certain zone, a series of supply and return conductors for circulating the said heat transfer medium through said heating plant and heater, means in said series of supply and return conductors and separate similar means adjacent to said heater and in said zone for controlling the normal circulation of said heat transfer medium through said system and heater, by-passes around each of said controlling means, an electrically operated valve in each of said by-passes, means responsive to a drop in temperature in said by-pass for causing said valve to open and thereby permit rapid circulation of said heat transfer medium through said system, an electric circuit for operating said valves and burner, and thermally responsive means in said zone for controlling said circuit to simultaneously initiate the operation of said burner and open said valves.

4. A zone heating system, as set forth in claim 3, including an electric switch associated with each of said valves and responsive to a drop in temperature in said system for disconnecting said valves from said circuit to permit closing thereof and thereby resumption of the normal circulation of said heat transfer medium in said system when a pre-determined temperature has been reached.

5. A heating system comprising a heating plant including a burner, a space heater, supply and return conductors communicating a heat transfer medium between said plant and heater, an electric circuit for controlling the operation of said burner, thermally responsive means operated by heat from said heaters for making or breaking said circuit, a trap for condensate in said system having an orifice therein permitting normal circulation of said medium through said system, a by-pass around said trap, a valve in said by-pass of larger capacity then said orifice for permitting rapid circulation of said medium, means in said circuit for actuating said valve, and electric switch means responsive to heat in said by-pass for disconnecting the actuating means from said circuit, when the said by-pass has reached a substantially pre-determined temperature and for connecting said actuating means to said circuit in response to a drop in temperature in said by-pass, to permit operation of said heat responsive means to open said valve with the initiation of the operation of the burner when the said system is below said pre-determined temperature.

6. A steam heating system comprising a heat transfer medium heater, a space heater, supply pipes from said medium heater to said space heater, return pipes from said space heater to said medium heater, trap means in said return pipes permitting normal circulation of said heat medium in said pipes, a by-pass around said trap means, a valve in said by-pass permitting abnormal circulation of said medium and means responsive to heat in said pipes for operating said valve.

7. A steam heating system of the character described comprising a steam generating plant, a space heater, supply pipes leading from said plant to said heater, return pipes from said heater to said plant, a condensate trap in said return pipes permitting restricted circulation of steam through said system, a by-pass around said trap, a valve in said by-pass permitting unrestricted circulation through said system, and means responsive to heat from said heater and in said by-pass for operating said valve.

8. A heating system comprising means for heating a heat transfer medium, a heater, conductors for conducting said heat transfer medium from said heating means to said heater, return conductors for conducting said heat transfer medium from said heater to said heating means, a connection between said supply and return conductors, a valve in said connection, means adapted to open said valve in response to a drop in temperature in said conductors for permitting rapid circulation of said heat transfer medium through said system and to close said valve when the said conductors have reached a substantially pre-determined temperature, a by-pass conductor around said valve, and trap means in said by-pass conductor permitting normal circulation of said heat transfer medium.

ROBERT D. SYMONDS.